US010420107B2

(12) United States Patent
Krishnamoorthy et al.

(10) Patent No.: US 10,420,107 B2
(45) Date of Patent: Sep. 17, 2019

(54) TECHNIQUES AND APPARATUSES FOR DEVICE-TO-DEVICE COMMUNICATION USING AN ACTIVE SECONDARY COMPONENT CARRIER COMMUNICATION CHAIN

(71) Applicant: QUALCOMM Incorporated, San Diego, CA (US)

(72) Inventors: Parthasarathy Krishnamoorthy, San Diego, CA (US); Ishdeep Singh Juneja, Hyderabad (IN); Naveen Kumar Pasunooru, Hyderabad (IN); Prashanth Mohan, Chennai (IN); Raevanth Venkat Annam, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 49 days.

(21) Appl. No.: 15/699,652

(22) Filed: Sep. 8, 2017

(65) Prior Publication Data

US 2019/0082439 A1    Mar. 14, 2019

(51) Int. Cl.
*H04W 72/04* (2009.01)
*H04L 5/00* (2006.01)
(Continued)

(52) U.S. Cl.
CPC ......... *H04W 72/0453* (2013.01); *H04L 5/003* (2013.01); *H04L 5/0098* (2013.01);
(Continued)

(58) Field of Classification Search
CPC . H04W 72/0453; H04W 8/005; H04W 76/28; H04W 84/042; H04B 7/0413; H04L 5/0007
(Continued)

(56) References Cited

U.S. PATENT DOCUMENTS

| 2011/0151887 A1* | 6/2011 | Hakola | H04L 5/001 455/452.2 |
| 2016/0037322 A1* | 2/2016 | Nguyen | H04W 76/14 370/329 |

(Continued)

FOREIGN PATENT DOCUMENTS

| EP | 3352508 A1 | 7/2018 |
| WO | 2017048013 A1 | 3/2017 |
| WO | WO-2017077463 A1 | 5/2017 |

OTHER PUBLICATIONS

Intel Corporation: "Further Discussion on Interruption Requirements for D2D", 3GPP Draft, R4-150165 D2D Interruption Requirement, 3RD Generation Partnership Project (3GPP), Mobile Competence Centre, 650, Route Des Lucioles, F-06921 Sophia-Antipolis Cedex, France, vol. Ran WG4, No. Athens, Greece, Feb. 9, 2015-Feb. 13, 2015, Feb. 8, 2015 (Feb. 8, 2015), XP050937660, 7 Pages, Retrieved from the Internet: URL:http:/Awww.3gpp.org/ftp/Meetings_3GPP_SYNC/RAN4/Docs/ [retrieved on Feb. 8, 2015].

(Continued)

*Primary Examiner* — William Nealon
(74) *Attorney, Agent, or Firm* — Harrity & Harrity, LLP

(57) ABSTRACT

Certain aspects of the present disclosure generally relate to wireless communication. In some aspects, a user equipment may determine whether at least one frequency band, designated for device-to-device communication of the user equipment, is associated with an active SCC of the user equipment; and selectively perform the device-to-device communication using a particular communication chain of the user equipment based at least in part on whether the at least one frequency band is associated with the active SCC, wherein the particular communication chain is tuned to the at least one frequency band for communication using the active SCC. Numerous other aspects are provided.

30 Claims, 9 Drawing Sheets

(51) Int. Cl.
*H04W 76/14* (2018.01)
*H04B 7/0413* (2017.01)
*H04W 8/00* (2009.01)
*H04W 76/28* (2018.01)
*H04W 84/04* (2009.01)
*H04L 25/02* (2006.01)
*H04W 76/15* (2018.01)

(52) U.S. Cl.
CPC ........... *H04W 8/005* (2013.01); *H04W 76/14* (2018.02); *H04B 7/0413* (2013.01); *H04L 5/0007* (2013.01); *H04L 5/0023* (2013.01); *H04L 25/0202* (2013.01); *H04W 76/15* (2018.02); *H04W 76/28* (2018.02); *H04W 84/042* (2013.01)

(58) Field of Classification Search
USPC .......................................................... 370/329
See application file for complete search history.

(56) References Cited

U.S. PATENT DOCUMENTS

| | | |
|---|---|---|
| 2016/0044552 A1 | 2/2016 | Heo et al. |
| 2016/0295499 A1 | 10/2016 | Tavildar et al. |
| 2017/0041773 A1 | 2/2017 | Fujishiro et al. |
| 2017/0150340 A1 | 5/2017 | Park |
| 2017/0195905 A1* | 7/2017 | Jung ..................... H04W 24/08 |
| 2017/0318536 A1* | 11/2017 | Manepalli ......... H04W 52/0245 |
| 2017/0367059 A1* | 12/2017 | Park ..................... H04W 36/30 |

OTHER PUBLICATIONS

International Search Report and Written Opinion—PCT/US2018/047332—ISA/EPO—dated Dec. 5, 2018.

* cited by examiner

TECHNIQUES AND APPARATUSES FOR DEVICE-TO-DEVICE COMMUNICATION USING AN ACTIVE SECONDARY COMPONENT CARRIER COMMUNICATION CHAIN

FIELD OF THE DISCLOSURE

Aspects of the present disclosure generally relate to wireless communication, and more particularly to techniques and apparatuses for device-to-device communication using an active secondary component carrier communication chain.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining whether at least one frequency band, designated for device-to-device communication of the user equipment, is associated with an active secondary component carrier (SCC) of the user equipment; and selectively performing the device-to-device communication using a particular communication chain of the user equipment based at least in part on whether the at least one frequency band is associated with the active SCC, wherein the particular communication chain is tuned to the at least one frequency band for communication using the active SCC.

In some aspects, a user equipment may include a memory at least one processor coupled to the memory. The at least one processor may be configured to determine whether at least one frequency band, designated for device-to-device communication of the user equipment, is associated with an active SCC of the user equipment; and selectively perform the device-to-device communication using a particular communication chain of the user equipment based at least in part on whether the at least one frequency band is associated with the active SCC, wherein the particular communication chain is tuned to the at least one frequency band for communication using the active SCC.

In some aspects, a non-transitory computer-readable medium may store one or more instructions for wireless communication. The one or more instructions, when executed by one or more processors of a user equipment, may cause the one or more processors to determine whether at least one frequency band, designated for device-to-device communication of the user equipment, is associated with an active SCC of the user equipment; and selectively perform the device-to-device communication using a particular communication chain of the user equipment based at least in part on whether the at least one frequency band is associated with the active SCC, wherein the particular communication chain is tuned to the at least one frequency band for communication using the active SCC.

In some aspects, an apparatus for wireless communication may include means for determining whether at least one frequency band, designated for device-to-device communication of the apparatus, is associated with an active SCC of the apparatus; and means for selectively performing the device-to-device communication using a particular communication chain of the apparatus based at least in part on whether the at least one frequency band is associated with the active SCC, wherein the particular communication chain is tuned to the at least one frequency band for communication using the active SCC.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
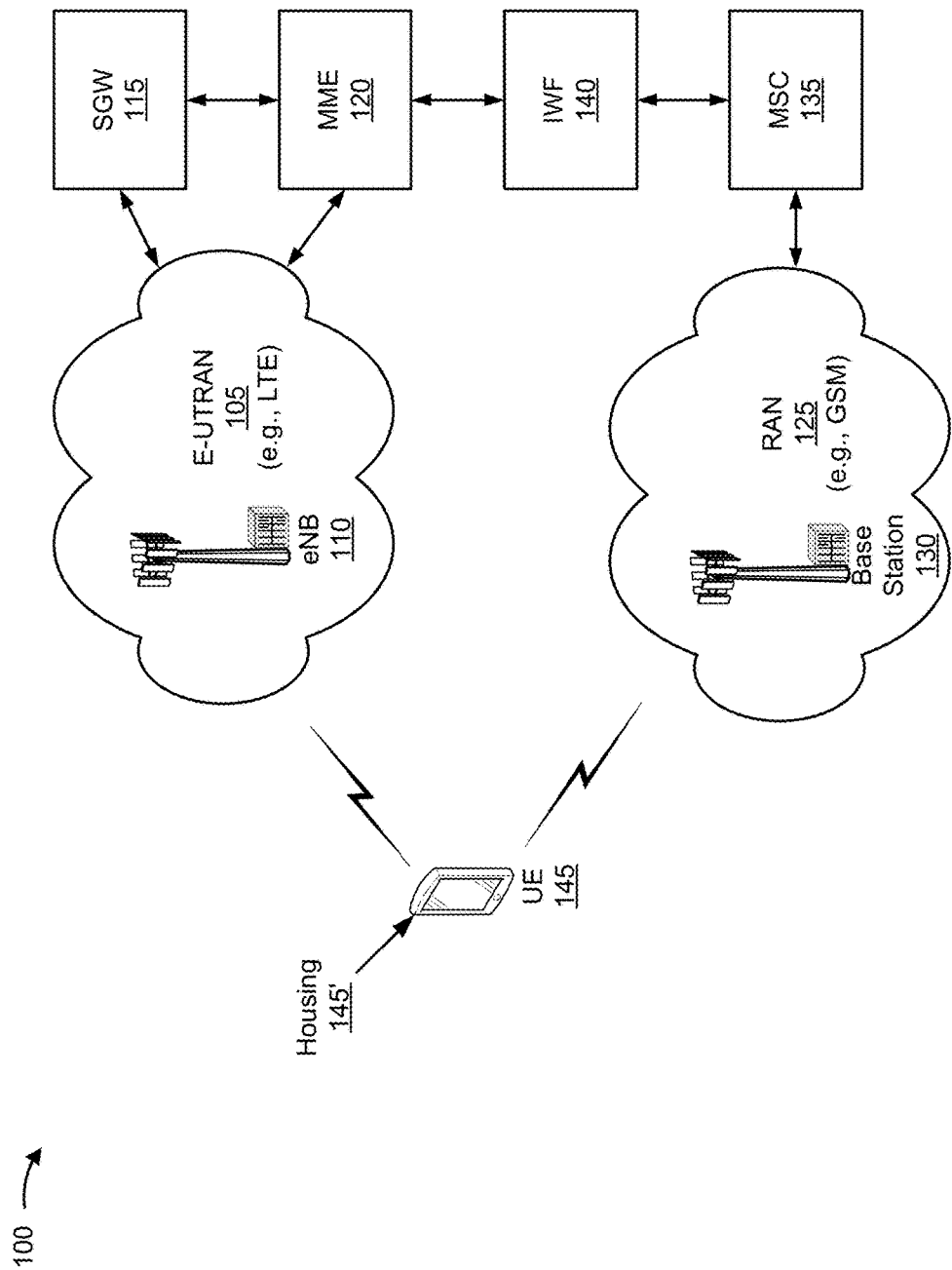
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
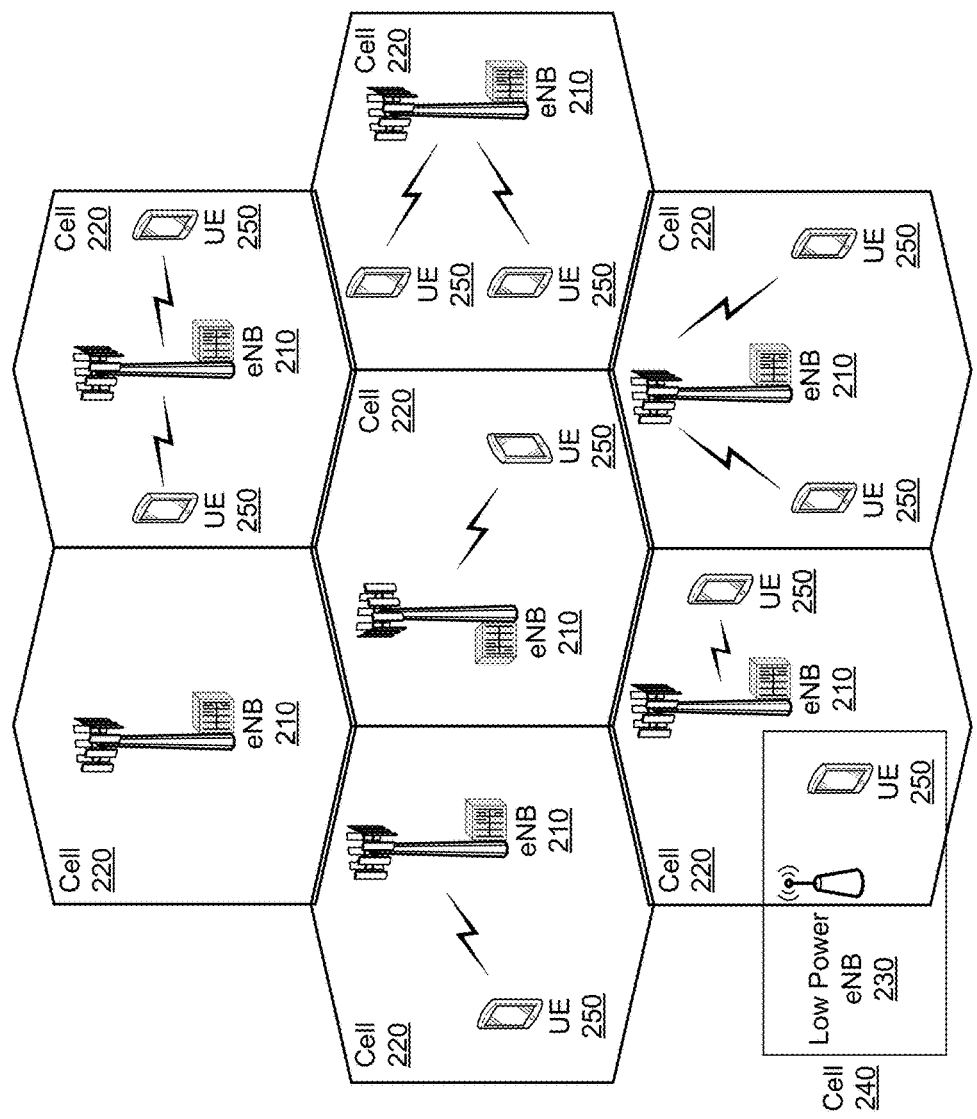
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, orthogonal frequency division multiplexing (OFDM) is used on the downlink (DL) and single-carrier frequency division multiple access (SC-FDMA) is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
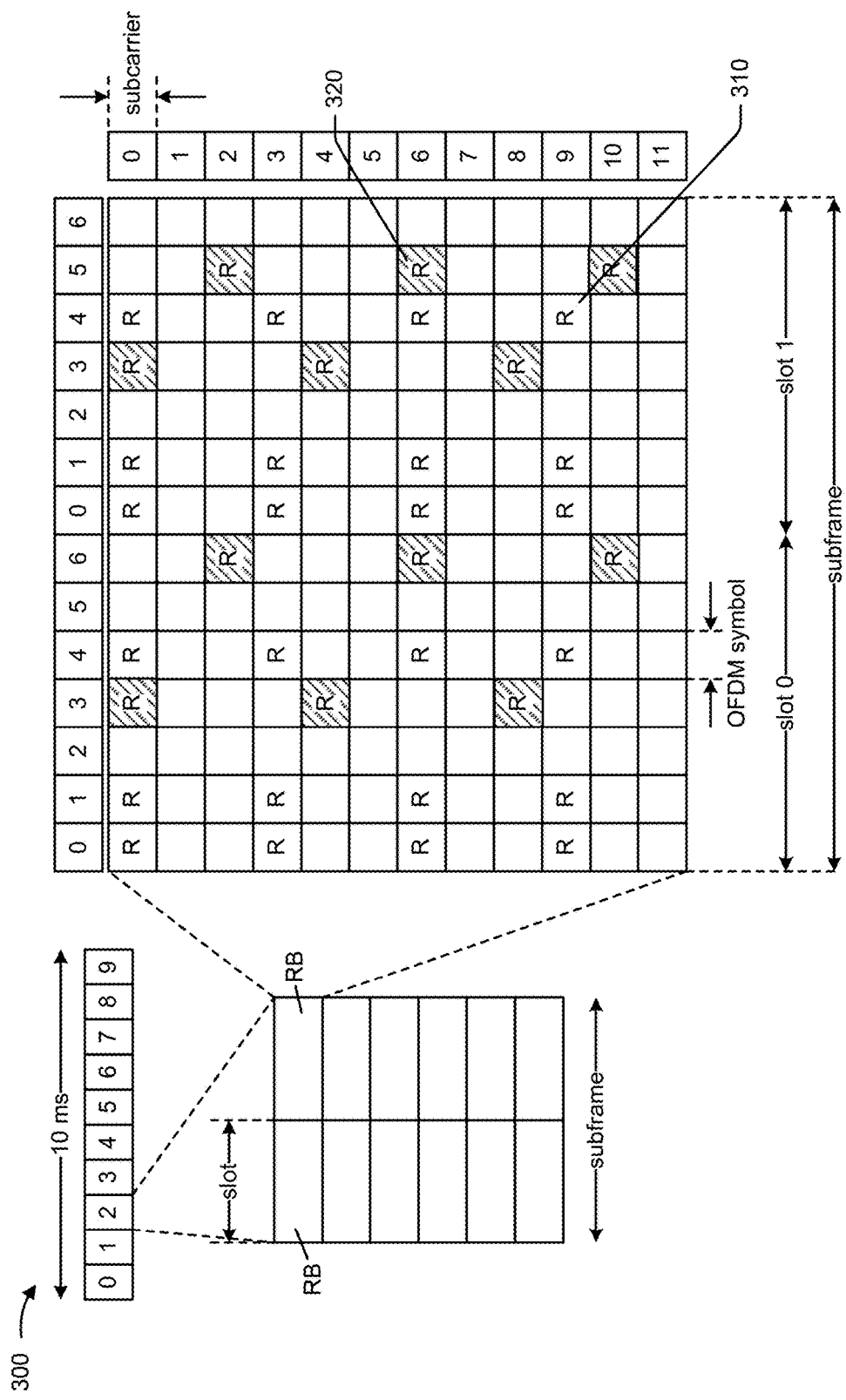
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical hybrid automatic repeat request (HARQ) Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
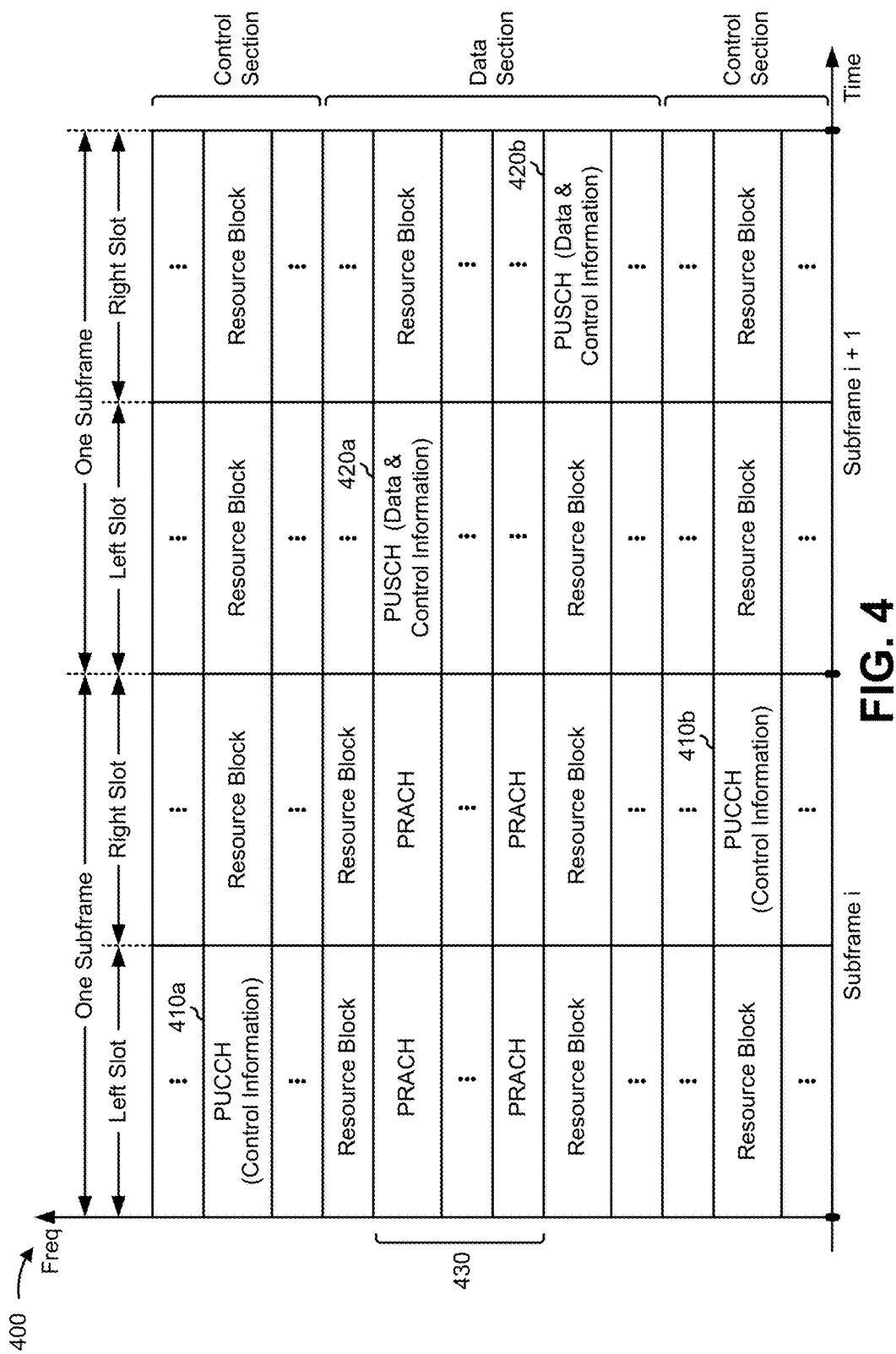
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

As indicated above, FIG. 4 is provided as an example. Other examples are possible and may differ from what was described above in connection with FIG. 4.

Figure 5:
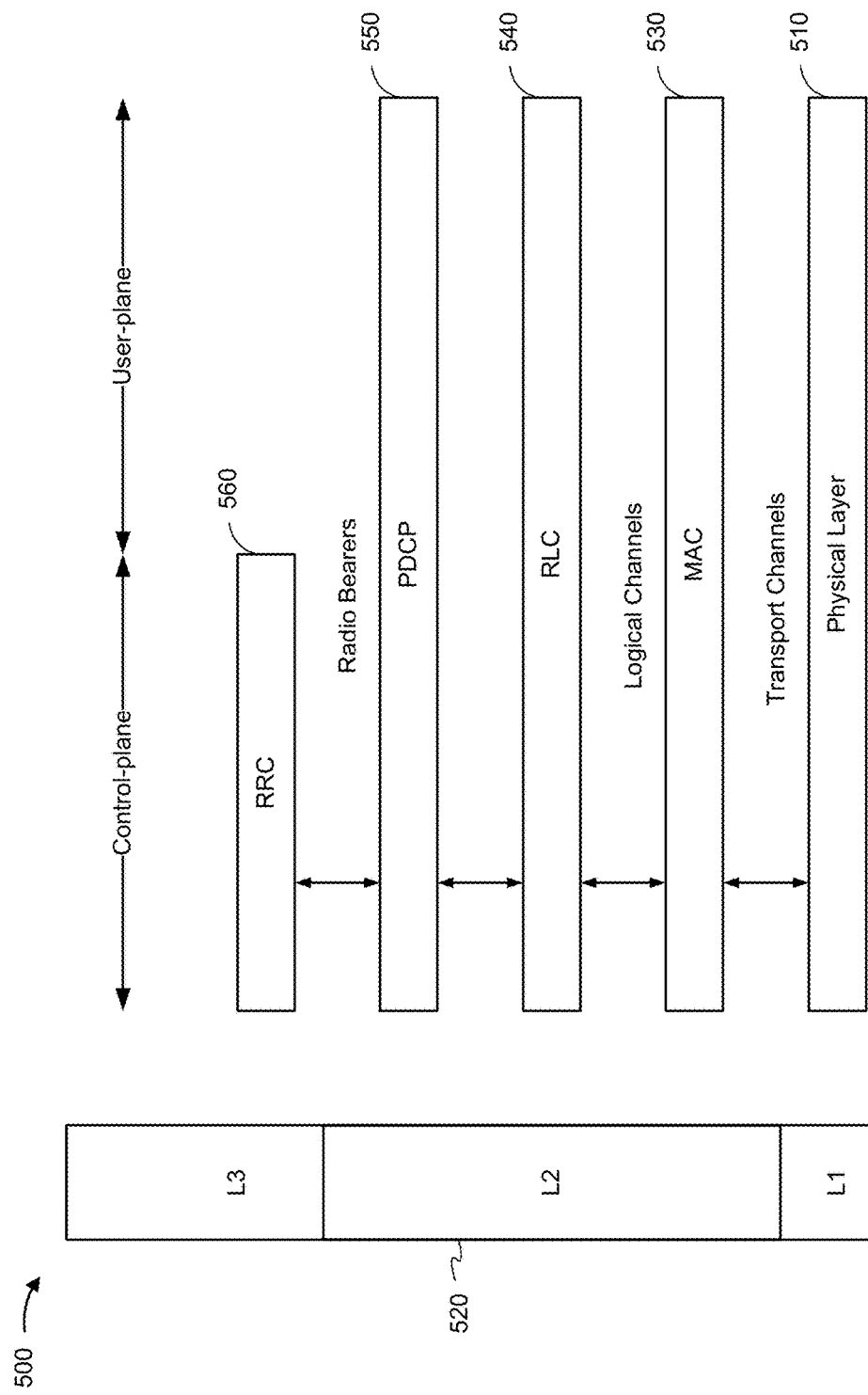
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
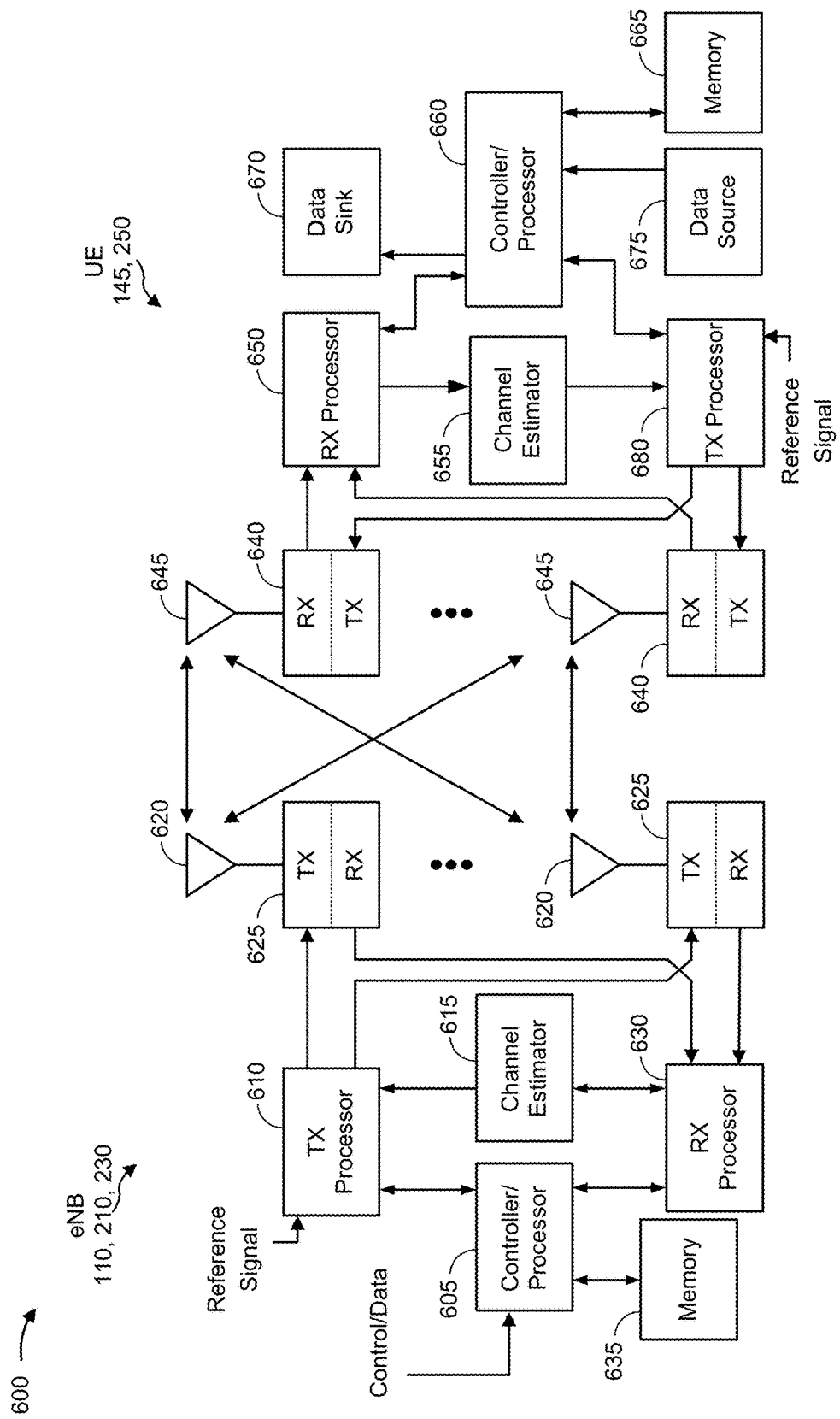
FIG. 6 is a diagram illustrating example components of an evolved Node B and a user equipment in an access network, in accordance with various aspects of the present disclosure.

FIG. 6 is a diagram illustrating example components 600 of a base station such as an eNB 110, 210, 230 and a UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates a radio frequency (RF) carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the controller/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to perform device-to-device communication using an active secondary component carrier communication chain, as described in more detail elsewhere herein. For example, the controller/processor 660 and/or other processors and modules of UE 145, 250 may perform or direct operations of, for example, process 900 of FIG. 9 and/or other processes as described herein. In some aspects, one or more of the components shown in FIG. 6 may be employed to perform example process 900 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
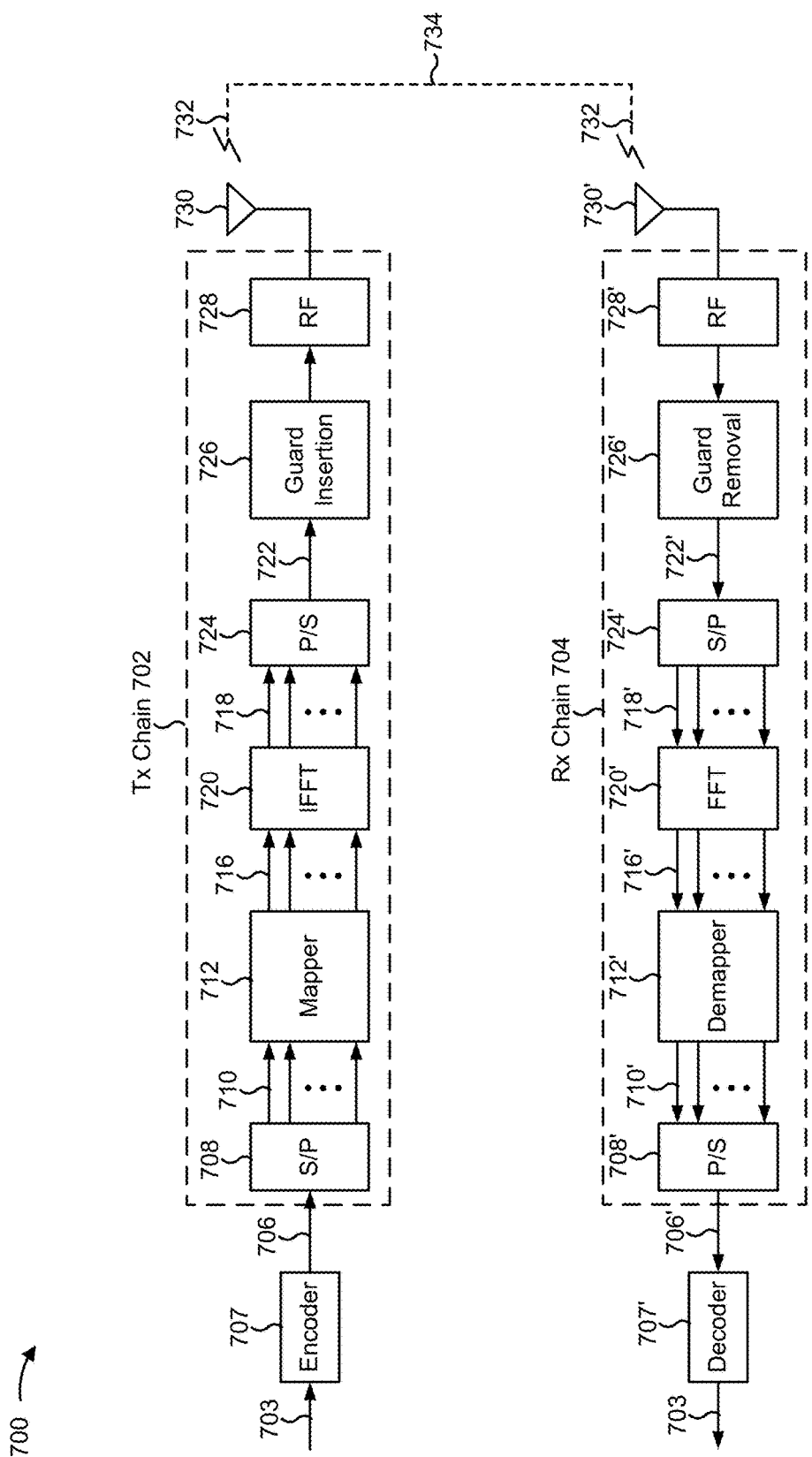
FIG. 7 is a diagram illustrating an example of a transmission (Tx) chain and a receiver (Rx) chain that may be used within a wireless communication system, in accordance with various aspects of the present disclosure.

FIG. 7 is a diagram illustrating an example 700 of a transmission (Tx) chain 702 and a receiver (Rx) chain 704 that may be used within a wireless communication system, in accordance with various aspects of the present disclosure. As used herein, a communication chain may include at least one Tx chain 702 and/or at least one Rx chain 704. In some aspects, UE 145, 250 may include multiple communication chains. In some aspects, when using carrier aggregation, a communication chain may be used for communications using a component carrier, such as a primary component carrier (PCC), a secondary component carrier (SCC), and/or the like.

In some aspects, portions of Tx chain 702 may be implemented in a transmitter 625TX and/or 640TX, shown in FIG. 6. In some aspects, Tx chain 702 may be implemented in eNB 110, 210, 230 for transmitting data 706 to UE 145, 250 on a downlink channel. In some aspects, Tx chain 702 may be implemented in UE 145, 250 for transmitting data 706 to eNB 110, 210, 230 on an uplink channel.

An encoder 707 may alter a signal (e.g., a bitstream) 703 into data 706. Data 706 to be transmitted is provided from encoder 707 as input to a serial-to-parallel (S/P) converter 708. In some aspects, S/P converter 708 may split the transmission data into N parallel data streams 710.

The N parallel data streams 710 may then be provided as input to a mapper 712. Mapper 712 may map the N parallel data streams 710 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 712 may output N parallel symbol streams 716, each symbol stream 716 corresponding to one of N orthogonal subcarriers of an inverse fast Fourier transform (IFFT) component 720. These N parallel symbol streams 716 are represented in the frequency domain and may be converted into N parallel time domain sample streams 718 by IFFT component 720.

In some aspects, N parallel modulations in the frequency domain are equal to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 718 may be converted into an OFDM/OFDMA symbol stream 722 by a parallel-to-serial (P/S) converter 724. A guard insertion component 726 may insert a guard interval between successive OFDM/OFDMA symbols in the OFDM/OFDMA symbol stream 722. The output of guard insertion component 726 may then be upconverted to a desired transmit frequency band by a radio frequency (RF) front end 728. An antenna 730 may then transmit the resulting signal 732.

In some aspects, Rx chain 704 may utilize OFDM/OFDMA. In some aspects, portions of Tx chain 702 may be implemented in a receiver 625RX and/or 640RX, shown in FIG. 6. In some aspects, Rx chain 704 may be implemented in UE 145, 250 for receiving data 706 from eNB 110, 210, 230 on a downlink channel. In some aspects, Rx chain 704 may be implemented in eNB 110, 210, 230 for receiving data 706 from UE 145, 250 on an uplink channel.

A transmitted signal 732 is shown traveling over a wireless channel 734 from Tx chain 702 to Rx chain 704. When a signal 732' is received by an antenna 730', the received signal 732' may be downconverted to a baseband signal by an RF front end 728'. A guard removal component 726' may then remove the guard interval that was inserted between OFDM/OFDMA symbols by guard insertion component 726.

The output of guard removal component 726' may be provided to an S/P converter 724'. The output may include an OFDM/OFDMA symbol stream 722', and S/P converter 724' may divide the OFDM/OFDMA symbol stream 722' into N parallel time-domain symbol streams 718', each of which corresponds to one of the N orthogonal subcarriers. A fast Fourier transform (FFT) component 720' may convert the N parallel time-domain symbol streams 718' into the frequency domain and output N parallel frequency-domain symbol streams 716'.

A demapper 712' may perform the inverse of the symbol mapping operation that was performed by mapper 712, thereby outputting N parallel data streams 710'. A P/S converter 708' may combine the N parallel data streams 710' into a single data stream 706'. Ideally, data stream 706' corresponds to data 706 that was provided as input to Tx chain 702. Data stream 706' may be decoded into a decoded data stream 703 by decoder 707'.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single components, or a single components shown in FIG. 7 may be implemented as multiple, distributed components. Additionally, or alternatively, a set of components (e.g., one or more components) shown in FIG. 7 may perform one or more functions described as being performed by another set of components shown in FIG. 7.

A UE 145, 250 may communicate with an eNB 110, 210, 230 using carrier aggregation (CA). In CA, a primary component carrier (PCC) and at least one secondary component carrier (SCC) are used to communicate. Each PCC and SCC may be associated with a different frequency band. By using the PCC and the at least one SCC to communicate, frequency diversity and bandwidth of the UE 145, 250 are improved. In some aspects, information communicated using the PCC may be more important than information communicated using the SCC. For example, the PCC may be used for high-priority traffic, control data, and/or the like, whereas the SCC may be used for low-priority traffic, repetitious traffic, and/or the like.

UEs 145, 250 may communicate with each other using device-to-device communications. As used herein, a device-to-device communication refers to a communication between a first UE 145, 250 and a second UE 145, 250, wherein at least part of the communication is not via an intermediate device (e.g., an eNB 110, 210, 230 and/or the like). In some aspects, a device-to-device communication may be similar to a sidelink communication, although techniques and apparatuses described herein are not limited to sidelink communications.

One example of a device-to-device communication protocol is the LTE-Direct (LTE-D) protocol. In LTE-D, UEs 145, 250 may discover each other using sidelink communications, then may communicate with each other in a particular frequency band via an eNB 110, 210, 230. The sidelink communications and/or the communications via the eNB 110, 210, 230 may occur in the particular frequency band. The particular frequency band may be defined by a scheduling entity of a cell that includes the UEs 145, 250, such as an eNB 110, 210, 230, and/or the like. However it may be time-consuming and/or impossible to retune a communication chain of a UE 145, 250 from an original frequency band, associated with a PCC or SCC of the UE 145, 250, to the particular frequency band, and back to the original band after the LTE-D communication ceases. For example, when the UE 145, 250 is associated with a short connected-mode discontinuous reception (C-DRX) cycle (e.g., 40 ms, 80 ms, and/or the like), it may be difficult or impossible to tune and retune the UE 145, 250 quickly enough to comport with the C-DRX cycle. This may cause dropped calls, decreased throughput, and negative user experience.

Some techniques and apparatuses described herein provide for device-to-device communication (e.g., LTE-D, sidelink communications, and/or the like) using an active SCC communication chain. The active SCC communication chain may include a Tx chain and/or an Rx chain of the UE 145, 250 that is used to perform communications using an SCC. When the SCC is associated with a same frequency band as a device-to-device communication of the UE 145, 250, the UE 145, 250 may use the active SCC communication chain to perform the device-to-device communication, then may release the active SCC communication chain for the SCC. Thus, tuning and retuning of the active SCC communication chain is avoided, which saves time that would otherwise be used to tune a communication chain of the UE 145, 250 for device-to-device communications. This may be particularly advantageous for a UE that uses a short C-DRX cycle length, since the time that would be used to tune and retune the communication chain would otherwise render the device-to-device communications difficult or impossible.

Figure 8:
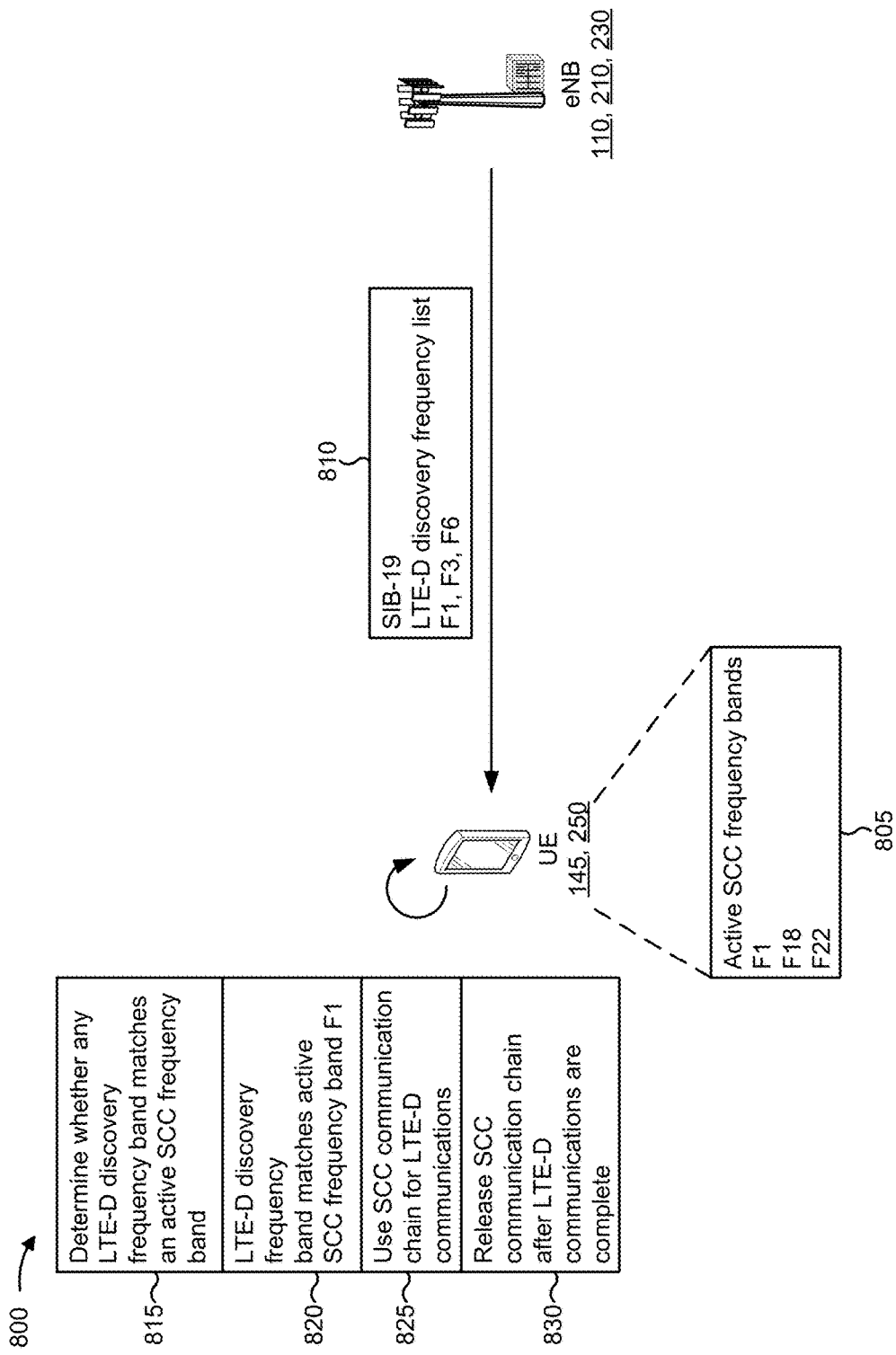
FIG. 8 is a diagram illustrating an example of device-to-device communication using a secondary component carrier communication chain without retuning of the communication chain, in accordance with various aspects of the present disclosure.

FIG. 8 is a diagram illustrating an example of device-to-device communication using a secondary component carrier communication chain without retuning of the communication chain, in accordance with various aspects of the present disclosure. Example 800 is described with regard to LTE-D. However, the techniques and apparatuses described with regard to FIG. 8 are not limited to those involving LTE-D. For example, the techniques and apparatuses described with regard to FIG. 8 may be used for any form of device-to-device communication or sidelink communication that can share one or more frequency bands with an SCC of the UE 145, 250.

As shown in FIG. 8, and by reference number 805, a UE 145, 250 may be associated with one or more active SCC frequency bands. As used herein, an active SCC frequency band refers to a frequency band in which an SCC has been established and/or a frequency band in which an SCC is being used by the UE 145, 250 for communication. For example, when the UE 145, 250 is associated with an active SCC, a communication chain of the UE 145, 250 may be tuned to a frequency band corresponding to the active SCC. Thus, as described in more detail below, when a frequency band of a device-to-device communication matches the frequency band corresponding to the active SCC, the UE 145, 250 can perform the device-to-device communication without having to retune the communication chain. As shown, the active SCC frequency bands include a frequency band F1, a frequency band F18, and a frequency band F22.

As shown by reference number 810, the UE 145, 205 may receive a system information block from the eNB 110, 210, 230. Here, the system information block includes SIB-19, which may identify inter-RAT frequency and priority information to be used in a cell provided by the eNB 110, 210, 230. Furthermore, SIB-19 may provide information identifying frequency bands associated with device-to-device communications. Here, SIB-19 identifies a list of LTE-D discovery frequencies (e.g., F1, F3, and F6). Note that one of the LTE-D discovery frequencies (e.g., F1) matches one of the active SCC frequency bands (e.g., F1). In some aspects, the UE 145, 250 may receive other information that identifies frequency bands associated with the device-to-device communications. For example, techniques and apparatuses described herein are not limited to those wherein the information that identifies frequency bands associated with the device-to-device communications are received in a SIB.

As shown by reference number 815, the UE 145, 250 may determine whether any LTE-D discovery frequency band matches an active SCC frequency band of the UE 145, 250. For example, the UE 145, 250 may store information identifying the active SCC frequency bands, and may store information identifying the LTE-D discovery frequency bands (e.g., based at least in part on SIB-19 or another system information block). The UE 145, 250 may compare the information identifying the active SCC frequency band and the information identifying the LTE-D discovery frequency bands to determine whether any frequency band is an active SCC frequency band and an LTE-D discovery frequency band.

As shown by reference number 820, the UE 145, 250 may determine that an LTE-D discovery frequency band matches the active SCC frequency band F1. Therefore, the UE 145, 250 may know that a communication chain of the UE 145, 250 is tuned to the active SCC frequency band F1, and can be used for LTE-D communications on frequency band F1. In some aspects, when multiple frequency bands match, the UE 145, 250 may identify each frequency band that matches an active SCC frequency band. This may enable device-to-device communications on multiple different frequency bands.

As shown by reference number 825, the UE 145, 250 may use a communication chain associated with the active SCC frequency band for the device-to-device communications (e.g., the LTE-D activities). In this way, the UE 145, 250 can perform the device-to-device communications without retuning a communication chain of the UE 145, 250, which reduces delay associated with the device-to-device communications and/or the retuning. For example, in one aspect, it may take approximately 30 ms to tune to an LTE-D frequency and 30 ms to retune to a serving frequency of the UE 145, 250. The UE 145, 250 may avoid the delay of approximately 60 ms by using the communication chain associated with the active SCC frequency band of F1. Furthermore, since less time is needed for tuning and retuning activities, the UE 145, 250 conserves battery and processing power associated with the tuning and retuning activities (e.g., since the UE 145, 250 can enter a sleep mode in time that would otherwise be used for tuning and/or retuning activities). As shown by reference number 830, the UE 145, 250 may release the communication chain for SCC activities after the device-to-device communication is complete. For example, the UE 145, 250 may release the communication chain for SCC wireless wide area network (SCC WWAN) operations.

In some aspects, the UE 145, 250 may determine that no LTE-D discovery frequency band matches an active SCC frequency band. In such a case, the UE 145, 250 may tune a communication chain of the UE 145, 250 to the frequency band associated with the device-to-device communications, and may perform the device-to-device communications. The UE 145, 250 may then retune to a previous frequency band (e.g., a frequency band associated with a serving cell of the UE 145, 250), and may activate CA.

As indicated above, FIG. 8 is provided as an example. Other examples are possible and may differ from what was described with respect to FIG. 8.

Figure 9:
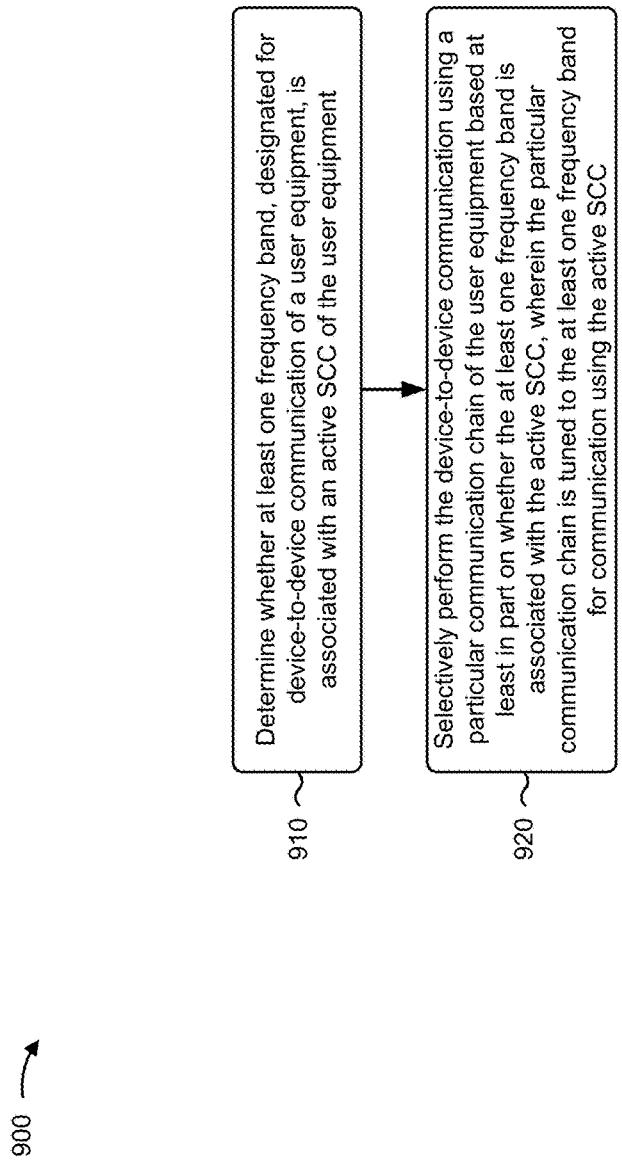
FIG. 9 is a diagram illustrating an example process performed, for example, by a wireless communication device, in accordance with various aspects of the present disclosure.

FIG. 9 is a diagram illustrating an example process 900 performed, for example, by a wireless communication device (e.g., a UE 145, 250, and/or the like), in accordance with various aspects of the present disclosure. Example process 900 is an example where a user equipment (e.g., UE 145, 250) performs device-to-device communication using an active SCC communication chain.

As shown in FIG. 9, in some aspects, process 900 may include determining whether at least one frequency band, designated for device-to-device communication of a user equipment, is associated with an active SCC of the user equipment (block 910). For example, the user equipment may determine whether at least one frequency band is associated with an active SCC of the user equipment and is designated for device-to-device communication (e.g., LTE-D, sidelink communications, and/or the like). In some aspects, the user equipment may identify the at least one frequency band based at least in part on system information and/or the like.

As shown in FIG. 9, in some aspects, process 900 may include selectively performing the device-to-device communication using a particular communication chain of the user equipment based at least in part on whether the at least one frequency band is associated with the active SCC, wherein the particular communication chain is tuned to the at least one frequency band for communication using the active SCC (block 920). For example, the user equipment may selectively perform the device-to-device communication using a particular communication chain (associated with the active SCC) or another communication (not associated with the active SCC). The user equipment may perform the device-to-device communication using the particular communication chain when the at least one frequency band designated for the device-to-device communication is associated with the active SCC. Thus, retuning of the particular communication chain is avoided. The user equipment may not perform the device-to-device communication using the particular communication chain when no frequency band designated for device-to-device communications is associated with an active SCC.

In some aspects, when the at least one frequency band is associated with the active SCC, the device-to-device communication is performed using the particular communication chain. In some aspects, the at least one frequency band is identified based at least in part on a system information block received by the user equipment. In some aspects, the particular communication chain is released for communication using the active SCC after the device-to-device communication is performed.

In some aspects, the device-to-device communication comprises a Long Term Evolution-Direct (LTE-D) communication. In some aspects, when the at least one frequency band is not associated with the active SCC, the user equipment is configured to perform the device-to-device communication by tuning at least one communication chain of the user equipment to the at least one frequency band. In some aspects, the user equipment is configured to retune the at least one communication chain to a serving cell frequency and activate carrier aggregation after the device-to-device communication is performed.

In some aspects, the at least one frequency band includes multiple frequency bands, and wherein the particular communication chain is one of multiple communication chains for communication using respective active SCCs, and the device-to-device communication is performed using the multiple communication chains based at least in part on the multiple frequency bands being associated with the respective active SCCs. In some aspects, the user equipment is associated with a connected-mode discontinuous reception (CDRX) cycle length of approximately 40 milliseconds. In some aspects, when the at least one frequency band is associated with the active SCC, the device-to-device communication is performed using the particular communication chain without retuning the particular communication chain.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   determining whether at least one frequency band, designated for device-to-device communication of the user equipment, is associated with an active secondary component carrier (SCC) of the user equipment;
   selecting a first communication chain of the user equipment for the device-to-device communication based at least in part on whether the at least one frequency band is associated with the active SCC,
      wherein, when the at least one frequency band is associated with the active SCC, the first communication chain is selected to be a communication chain associated with the active SCC; and
   performing the device-to-device communication using the first communication chain.

2. The method of claim 1, wherein, the at least one frequency band is associated with the active SCC, and the device-to-device communication is performed using the communication chain associated with the active SCC.

3. The method of claim 1, wherein the at least one frequency band is identified based at least in part on a system information block received by the user equipment.

4. The method of claim 1, wherein the first communication chain is released for communication using the active SCC after the device-to-device communication is performed.

5. The method of claim 1, wherein the device-to-device communication comprises a Long Term Evolution-Direct (LTE-D) communication.

6. The method of claim 1, wherein, when the at least one frequency band is not associated with the active SCC, the user equipment is configured to perform the device-to-device communication by tuning at least one communication chain of the user equipment to the at least one frequency band.

7. The method of claim 6, wherein the user equipment is configured to retune the at least one communication chain to a serving cell frequency and activate carrier aggregation after the device-to-device communication is performed.

8. The method of claim 1, wherein the at least one frequency band includes multiple frequency bands, and wherein the first communication chain is one of multiple communication chains for communication using respective active SCCs; and
   wherein the device-to-device communication is performed using the multiple communication chains based at least in part on the multiple frequency bands being associated with the respective active SCCs.

9. The method of claim 1, wherein the user equipment is associated with a connected-mode discontinuous reception (CDRX) cycle length of approximately 40 milliseconds.

10. The method of claim 1, wherein, when the at least one frequency band is associated with the active SCC, the device-to-device communication is performed using the first communication chain without retuning the first communication chain.

11. A user equipment for wireless communication, comprising:
   a memory; and
   at least one processor coupled to the memory, the memory and the at least one processor configured to:
      determine whether at least one frequency band, designated for device-to-device communication of the user equipment, is associated with an active secondary component carrier (SCC) of the user equipment;
      select a first communication chain of the user equipment for the device-to-device communication based at least in part on whether the at least one frequency band is associated with the active SCC,
         wherein, when the at least one frequency band is associated with the active SCC, the first communication chain is selected to be a communication chain associated with the active SCC; and
      perform the device-to-device communication using the first communication chain.

12. The user equipment of claim 11, wherein, the at least one frequency band is associated with the active SCC, and the device-to-device communication is performed using the communication chain associated with the active SCC.

13. The user equipment of claim 11, wherein the at least one frequency band is identified based at least in part on a system information block received by the user equipment.

14. The user equipment of claim 11, wherein the first communication chain is released for communication using the active SCC after the device-to-device communication is performed.

15. The user equipment of claim 11, wherein the device-to-device communication comprises a Long Term Evolution-Direct (LTE-D) communication.

16. The user equipment of claim 11, wherein, when the at least one frequency band is not associated with the active SCC, the user equipment is configured to perform the device-to-device communication by tuning at least one communication chain of the user equipment to the at least one frequency band.

17. The user equipment of claim 16, wherein the user equipment is configured to retune the at least one communication chain to a serving cell frequency and activate carrier aggregation after the device-to-device communication is performed.

18. The user equipment of claim 11, wherein the at least one frequency band includes multiple frequency bands, and wherein the first communication chain is one of multiple communication chains for communication using respective active SCCs; and
   wherein the device-to-device communication is performed using the multiple communication chains based at least in part on the multiple frequency bands being associated with the respective active SCCs.

19. The user equipment of claim 11, wherein the user equipment is associated with a connected-mode discontinuous reception (CDRX) cycle length of approximately 40 milliseconds.

20. The user equipment of claim 11, wherein, when the at least one frequency band is associated with the active SCC, the device-to-device communication is performed using the first communication chain without retuning the first communication chain.

21. An apparatus for wireless communication, comprising:
   means for determining whether at least one frequency band, designated for device-to-device communication of the apparatus, is associated with an active secondary component carrier (SCC) of the apparatus;
   means for selecting a first communication chain of the apparatus for the device-to-device communication based at least in part on whether the at least one frequency band is associated with the active SCC,
      wherein, when the at least one frequency band is associated with the active SCC, the first communication chain is selected to be a communication chain associated with the active SCC; and means for performing the device-to-device communication using the first communication chain.

22. The apparatus of claim 21, wherein, the at least one frequency band is associated with the active SCC, and the device-to-device communication is performed using the communication chain associated with the active SCC.

23. The apparatus of claim 21, wherein the at least one frequency band is identified based at least in part on a system information block received by the apparatus.

24. The apparatus of claim 21, wherein the first communication chain is released for communication using the active SCC after the device-to-device communication is performed.

25. The apparatus of claim 21, wherein the device-to-device communication comprises a Long Term Evolution-Direct (LTE-D) communication.

26. The apparatus of claim 21, wherein, when the at least one frequency band is not associated with the active SCC, the apparatus includes means for performing the device-to-device communication by tuning at least one communication chain of the apparatus to the at least one frequency band.

27. The apparatus of claim 26, wherein the apparatus includes means for retuning the at least one communication chain to a serving cell frequency and means for activating carrier aggregation after the device-to-device communication is performed.

28. A non-transitory computer-readable medium storing one or more instructions for wireless communication, the one or more instructions comprising:

one or more instructions that, when executed by one or more processors of a user equipment, cause the one or more processors to:
  determine whether at least one frequency band, designated for device-to-device communication of the user equipment, is associated with an active secondary component carrier (SCC) of the user equipment;
  select a first communication chain of the user equipment for the device-to-device communication based at least in part on whether the at least one frequency band is associated with the active SCC,
    wherein, when the at least one frequency band is associated with the active SCC, the first communication chain is selected to be a communication chain associated with the active SCC; and
  perform the device-to-device communication using the first communication chain.

29. The non-transitory computer-readable medium of claim 28, wherein, the at least one frequency band is associated with the active SCC, and the device-to-device communication is performed using the communication chain associated with the active SCC.

30. The non-transitory computer-readable medium of claim 28, wherein the at least one frequency band is identified based at least in part on a system information block received by the user equipment.

* * * * *